(12) United States Patent
Chan et al.

(10) Patent No.: US 11,445,238 B2
(45) Date of Patent: Sep. 13, 2022

(54) SYSTEM AND METHOD FOR SYNCHRONIZING AUDIO CONTENT ON A MOBILE DEVICE TO A SEPARATE VISUAL DISPLAY SYSTEM

(71) Applicant: CINEWAV PTE. LTD., Singapore (SG)

(72) Inventors: Jason Keng-Kwin Chan, Singapore (SG); Christian Joel Lee, Singapore (SG)

(73) Assignee: CINEWAV PTE. LTD., Singapore (SG)

( * ) Notice: Subject to any disclaimer, the term of this patent is extended or adjusted under 35 U.S.C. 154(b) by 0 days.

(21) Appl. No.: 17/610,089

(22) PCT Filed: May 8, 2020

(86) PCT No.: PCT/SG2020/050269
§ 371 (c)(1),
(2) Date: Nov. 9, 2021

(87) PCT Pub. No.: WO2020/231332
PCT Pub. Date: Nov. 19, 2020

(65) Prior Publication Data
US 2022/0248081 A1    Aug. 4, 2022

Related U.S. Application Data

(60) Provisional application No. 62/883,185, filed on Aug. 6, 2019, provisional application No. 62/845,897, filed on May 10, 2019.

(51) Int. Cl.
*G06F 3/00* (2006.01)
*G06F 13/00* (2006.01)
(Continued)

(52) U.S. Cl.
CPC . *H04N 21/43076* (2020.08); *H04N 21/41407* (2013.01); *H04N 21/41415* (2013.01); *H04N 21/439* (2013.01); *H04N 21/8547* (2013.01)

(58) Field of Classification Search
CPC ....... H04N 21/43076; H04N 21/41407; H04N 21/41415; H04N 21/439; H04N 21/8547
See application file for complete search history.

(56) References Cited

U.S. PATENT DOCUMENTS

2009/0057107 A1    3/2009    Pellenc et al.
2013/0070860 A1*   3/2013    Schramm ........... H04N 21/4341
                                                       709/217
(Continued)

FOREIGN PATENT DOCUMENTS

CN    2303768 Y    1/1999
CN    2452866 Y    10/2001
(Continued)

OTHER PUBLICATIONS

International Preliminary Report on Patentability for International Application No. PCT/SG2020/050269.
(Continued)

*Primary Examiner* — Kyu Chae
(74) *Attorney, Agent, or Firm* — JCIP; Joseph G. Chu; Jeremy I. Maynard

(57) ABSTRACT

A system and method of synchronizing a slave audio content configured for playback on a mobile device to a master audio content or master visual content configured for playing on a separate visual display system are provided for the purpose of enhancing an audience member's audio and visual experience in a public audio-visual show.

23 Claims, 8 Drawing Sheets

(51) Int. Cl.
*H04N 5/445* (2011.01)
*H04N 21/43* (2011.01)
*H04N 21/414* (2011.01)
*H04N 21/8547* (2011.01)
*H04N 21/439* (2011.01)

(56) References Cited

U.S. PATENT DOCUMENTS

| | | |
|---|---|---|
| 2014/0019520 A1 | 1/2014 | Milburn et al. |
| 2014/0355947 A1 | 12/2014 | Slamecka et al. |
| 2017/0105054 A1* | 4/2017 | Bannister ........... H04N 21/4305 |
| 2017/0126774 A1 | 5/2017 | Woodman et al. |
| 2017/0164034 A1 | 6/2017 | Kawa |
| 2021/0281717 A1* | 9/2021 | Smith ..................... H04N 5/06 |

FOREIGN PATENT DOCUMENTS

| | | | |
|---|---|---|---|
| CN | 109995123 A | 7/2019 | |
| JP | 3139263 U | 2/2008 | |
| KR | 1020150046407 A | 4/2015 | |
| WO | WO-2020060551 A1 * | 3/2020 | ............ G11B 27/10 |

OTHER PUBLICATIONS

International Search Report and Written Opinion of International Searching Authority for International Application No. PCT/SG2020/050269.

International Preliminary Report on Patentability of International Application No. PCT/SG2020/050429.

* cited by examiner

SYSTEM AND METHOD FOR SYNCHRONIZING AUDIO CONTENT ON A MOBILE DEVICE TO A SEPARATE VISUAL DISPLAY SYSTEM

TECHNICAL FIELD

The present disclosure generally relates to audio-visual systems and in particular, systems and methods that are directed to enhancing an audience member's audio experience in a public audio-visual show. More particularly, the present disclosure relates to synchronizing the playback of audio content on one or more slave computing devices to an audio content or visual content on a separate master computing device.

BACKGROUND

The following discussion of the background to the invention is intended to facilitate an understanding of the present invention. However, it should be appreciated that the discussion is not an acknowledgment or admission that any of the material referred to was published, known or part of the common general knowledge in any jurisdiction as at the priority date of the application.

There are many instances where audio-visual shows in public settings have poor sound due to bad acoustics, under-powered amplifiers or speakers, noise pollution, radio-frequency (RF) interference (when using RF devices such as radio headphones) or a large distance between the speakers and the viewer (causing the audio to be out of synchronisation with the visual display due to the difference between the speed of light and sound). Such poor acoustics and/or large distances between an audience member and the visual display can have a profound impact on the overall experience, leading to diminished enjoyment and dissatisfaction of the event by the audience member.

Some applications have attempted to synchronize audio content played on a mobile device to the visual content played on a separate visual display system using streaming technology over the internet or a local communication network such as WIFI. Streaming, however, is resource intensive on mobile devices, using large amounts of data and battery. Furthermore, streaming of audio content is often out of synchronization with the video content due to network latency or interference to WIFI or data connections. WIFI connections are also prone to disconnection from mobile devices or have limited connections per router. Even minor synchronization issues and drop outs are problematic when watching audio-visual shows in public settings. Generally mobile devices do not keep accurate or consistent time and, with varying hardware and software, are prone to drift when playing audio content. Therefore, the risks of desynchronization of audio content on a mobile device to the visual content played on a visual display system, that is separate from the mobile device, are high and can diminish enjoyment of the audio-visual show by the audience member.

It is therefore an objective of the present disclosure to address most of the issues and limitations discussed above.

SUMMARY OF THE INVENTION

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to a first aspect of the present disclosure, there is provided a method of synchronizing an audio content configured for playback on a mobile device to a visual content of an audio-visual display configured for playing on a separate visual display system. The method comprises the steps of: presenting the visual content on a visual output device controlled by the visual display system at a first location and time, obtaining, from the visual display system, a visual display system true time based on a visual display system local time and a visual display system time deviation, and generating, by the visual display system, a synchronisation message configured for transmission to a processing server, wherein the synchronisation message includes the visual display system true time, a visual content state and a visual content timecode. The method further includes transmitting, by the processing server, the synchronisation message at a periodic time interval to the mobile device, and determining an audio content timecode that is based on the visual content timecode, a mobile device true time and the visual display system true time, wherein when triggered to play the audio content on the mobile device at a second location and time when the visual content state is in a playing mode, the audio content is played at the audio content timecode that is synchronised with the visual content timecode associated with the current position of the visual content on the visual display system.

Preferably, the method determines if the audio content timecode is out of synchronisation beyond a predetermined time interval with the visual content timecode on the visual display system, and adjusts playback of the audio content on the mobile device to the audio content timecode that is synchronised with the visual content timecode associated with the current position of the visual content on the visual display system, in response to when the audio content timecode is out of synchronisation beyond the predetermined time interval.

Preferably, the audio content timecode is determined based on aggregating the visual content timecode and the time difference between the mobile device true time and the visual display system true time.

Preferably, the synchronisation message is transmitted when there is an adjustment made to the visual content timecode.

Preferably, the synchronisation message is transmitted when there is a change in state to the visual content state.

Preferably, the mobile device true time is determined based on a mobile device local time and a mobile device time deviation, wherein the mobile device time deviation is the time difference between the mobile device local time and a time server current time derived from a time server in communication with the mobile device.

Preferably, the visual display system time deviation is the time difference between the visual display system local time and a time server current time derived from a time server in communication with the visual display system.

Preferably, the predetermined time interval is approximately 200 ms.

According to a second aspect of the present disclosure, there is provided a method of synchronizing a slave audio content configured for playback on a mobile device to a master audio content synchronised with a live visual display, wherein the master audio content is configured for playing on a separate visual display system. The method comprises the steps of: playing the master audio content on the visual display system at a first location and time, obtaining, from the visual display system, a visual display system true time based on a visual display system local time and a visual display system time deviation, and generating, by the visual display system, a synchronisation message configured for transmission to a processing server, wherein the synchronisation message includes the visual display system true time, a master audio content state and a master audio content timecode. The method further includes transmitting, by the processing server, the synchronisation message at a periodic time interval to the mobile device and determining a slave audio content timecode that is based on the master audio content timecode, a mobile device true time and the visual display system true time, wherein when triggered to play the slave audio content on the mobile device at a second location and time when the master audio content state is in a playing mode, the slave audio content is played at the slave audio content timecode that is synchronised with the master audio content timecode associated with the current position of the master audio content on the visual display system.

Preferably, the method determines if the slave audio content timecode is out of synchronisation beyond a predetermined time interval with the master audio content timecode on the visual display system, and adjusts playback of the slave audio content on the mobile device to the audio content timecode that is synchronised with the master audio content timecode associated with the current position of the master audio content on the visual display system, in response to when the slave audio content timecode is out of synchronisation beyond the predetermined time interval.

Preferably, the slave audio content comprises slave audio cue tracks for initiating a portion of the live visual display, whereby the slave audio cue tracks are transmitted to one or more control systems by one or more computing devices, such that the audio cue tracks are configured for synchronisation with the master audio content.

Preferably, the slave audio content comprises an audio sound track associated with a voice recording that is configured for synchronisation with the master audio content.

Preferably, the slave audio content comprises an audio sound track associated with a music accompaniment that is configured for synchronisation with the master audio content.

Preferably, the master audio content includes an audio cue track, configured for triggering a portion of a live visual display by a controller or manual operator.

Preferably, the slave audio content comprises a slave audio cue track configured for triggering a portion of a live visual display, by a manual operator, that is configured for synchronisation with the master audio content.

Preferably, the synchronisation message is transmitted when there is an adjustment made to the visual content timecode.

Preferably, the synchronisation message is transmitted when there is a change in state to the visual content state.

Preferably, the slave audio content timecode is determined based on aggregating the master audio content timecode and the time difference between the mobile device true time and the visual display system true time, and wherein the mobile device true time is determined based on a mobile device local time and a mobile device time deviation, wherein the mobile device time deviation is the time difference between the mobile device local time and a time server current time derived from a time server in communication with the mobile device.

Preferably, the visual display system true time is determined based on a visual display system local time and a visual display system time deviation, wherein the visual display system time deviation is the time difference between the visual display system local time and a time server current time derived from a time server in communication with the visual display system.

Preferably, the predetermined time interval is approximately 200 ms.

According to a third aspect of the disclosure, there is provided a method configured for implementing on a mobile device having at least one processor, at least one computer-readable storage medium, and a synchronisation application connected to a network. The method comprises transmitting an audio content configured for storing on the mobile device, obtaining a mobile device true time based on a mobile device local time and a mobile device time deviation, wherein the mobile device time deviation is the time difference between the mobile device local time and a time server current time derived from a time server in communication with the mobile device and receiving a synchronisation message at a periodic time interval from a processing server in wireless communication with a visual display system, wherein the synchronisation message includes a visual display system true time, a visual content state, and a visual content timecode. The method further includes determining an audio content timecode that is based on the visual content timecode, the mobile device true time and the visual display system true time wherein the visual display system true time is obtained from the time difference between the visual display system local time and a time server current time derived from a time server in communication with the visual display system, wherein when triggered to play the audio content on the mobile device when the visual content state is in a playing mode, the audio content is played at the audio content timecode that is synchronised with the visual content timecode associated with the current position of the visual content on the visual display system.

According to a fourth aspect of the disclosure, there is provided a method of synchronizing a slave audio content configured for playback on a mobile device to a master audio content configured for playing on a separate visual display system. The method comprises the steps of: obtaining, from the visual display system, a visual display system true time based on a visual display system local time and a visual display system time deviation wherein the visual display system time deviation is time difference between the visual display system local time and a time server current time derived from a time server in communication with the visual display system, generating, by the visual display system, a synchronisation message configured for transmission to a processing server, wherein the synchronisation message includes the visual display system true time, a master audio content state associated with the operation mode, and a master audio content timecode associated with the current position of the visual display system and transmitting, by the processing server, the synchronisation message at a periodic time interval to the mobile device. The method further includes determining a slave audio content timecode that is based on the master audio content timecode, a mobile device true time and the visual display system true time wherein the mobile device true time is based on the time difference between the mobile device local time and a time server current time derived from the time server in communication with the mobile device, wherein when triggered to play the slave audio content on the mobile device when the master audio content state is in a playing mode, the slave audio content is played at the slave audio content timecode that is synchronised with the master audio content timecode associated with the current position of the master audio content on the visual display system.

According to a fifth aspect of the disclosure, there is provided a system for synchronizing a slave audio content configured for playback on a mobile device to a master audio content configured for playing on a separate visual display system, comprising a memory, one or more processors coupled with the memory, wherein the memory includes processor executable code that, when executed by the processor, causes the processor to perform operations including: obtaining, from the visual display system, a visual display system true time; wherein the visual display system true time is determined based on a visual display system local time and a visual display system time deviation, wherein the visual display system time deviation is the time difference between the visual display system local time and a time server current time derived from a time server in communication with the visual display system; generating, by the visual display system, a synchronisation message configured for transmission to a processing server, wherein the synchronisation message includes the visual display system true time, a master audio content state associated with the operation mode, and a master audio content timecode associated with the current position of the visual display system and transmitting, by the processing server, the synchronisation message at a periodic time interval to the mobile device. It further includes determining a slave audio content timecode that is based on the master audio content timecode, a mobile device true time and the visual display system true time wherein the mobile device true time is based on the mobile device local time and a mobile device time deviation, wherein the mobile device time deviation is the time difference between the mobile device local time and a time server current time derived from the time server in communication with the mobile device; wherein when triggered to play the slave audio content on the mobile device when the master audio content state is in a playing mode, the slave audio content is played at the slave audio content timecode that is synchronised with the master audio content timecode associated with the current position of the master audio content on the visual display system.

BRIEF DESCRIPTION OF THE DRAWINGS

Some embodiments of the present invention are illustrated as an example and are not limited by the figures of the accompanying drawings.

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which.

DETAILED DESCRIPTION

Figure 1:
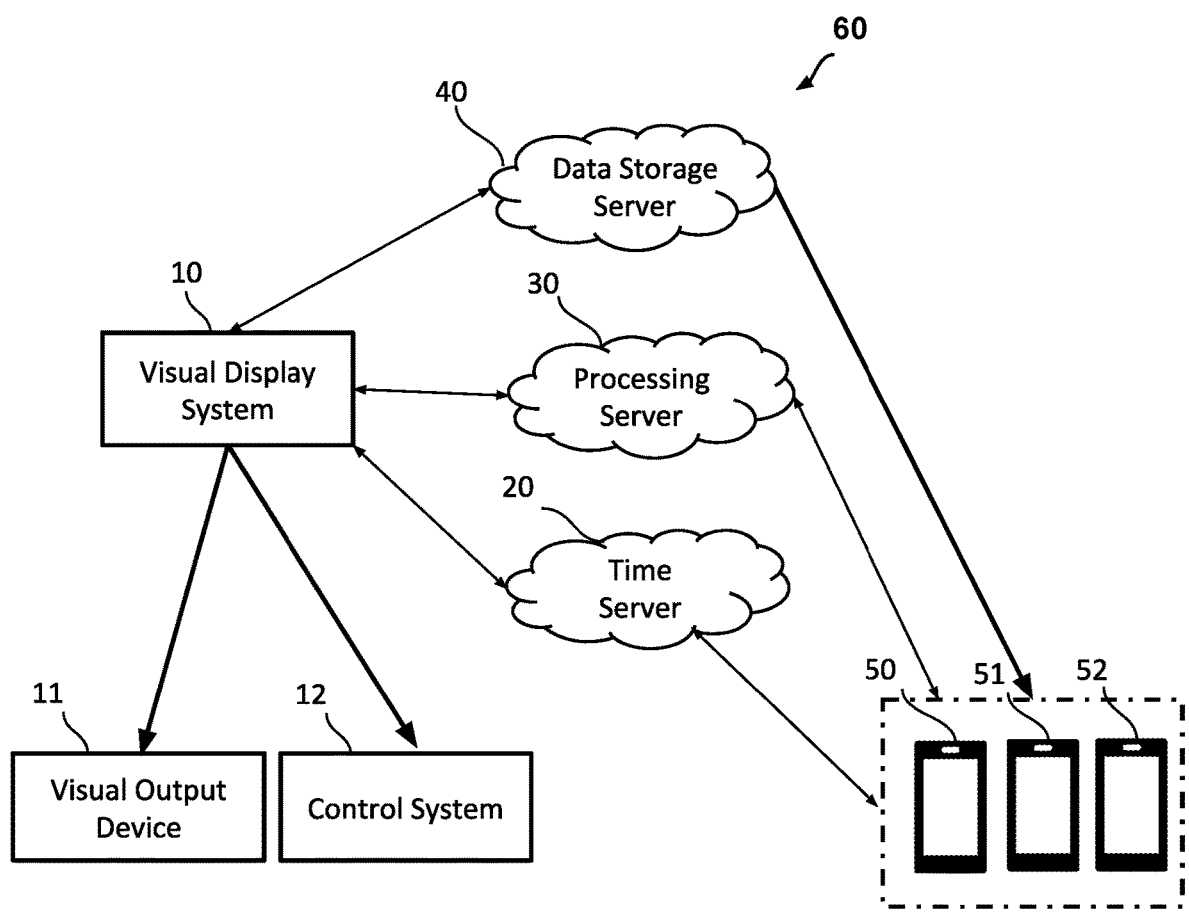
FIG. 1 shows a block diagram illustrating a high-level system architecture for synchronizing a slave audio content on one or more computing devices to a master audio content or a master visual content configured for playing on a separate visual display system in accordance with various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

Embodiments described in the context of one of the systems or methods are analogously valid for the other systems or methods. Similarly, embodiments described in the context of a system are analogously valid for a method, and vice-versa.

Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

As used herein and in the context of various embodiments, the expression "Visual Content" may refer to any type of visual media, for example, video or static visual media that is displayed on any electronic means, which may be capable of being moved, animated, changed or visually modified while viewed by a user. "Visual Content", as used in the context of various embodiments, may be used interchangeably with "Visual Data" which may refer to data used to manipulate visual elements like, but not limited to, fireworks, lasers, light projections, fountains etc.

As used herein and in the context of various embodiments, the expression "Audio Content" may be used interchangeably with "Audio Data".

As used herein and in the context of various embodiments, the articles "a", "an" and "the" as used with regard to a feature or element include a reference to one or more of the features or elements.

As used herein and in the context of various embodiments, the term "and/or" includes any and all combinations of one or more of the associated listed items.

Accordingly, in one or more example embodiments, the functions described may be implemented in hardware, software, or any combination thereof. If implemented in software, the functions may be stored on or encoded as one or more instructions or code on a computer-readable medium.

As used herein and in the context of various embodiments, the "second" and "first" as used in connection with a location and time, is used for distinguishing the location and time without limitation. For example, a "second location and time" may be provided without a "first location and time" being required, or conversely, a "first location and time" may be provided without a "second location and time" being required.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

In the specification, "timecode" refers to any symbolic naming of consistent, timed intervals throughout the entirety of an audio or visual media which can be used to reference the position of the "playing" or "stopped" audio or visual content file.

In order that the invention may be readily understood and put into practical effect, particular embodiments will now be described by way of examples and not limitations, and with reference to the figures. It will be understood that any property described herein for a specific system may also hold for any system described herein. It will be understood that any property described herein for a specific method may also hold for any method described herein. Furthermore, it will be understood that for any system or method described herein, not necessarily all the components or steps described must be enclosed in the system or method, but only some (but not all) components or steps may be enclosed.

The present disclosure seeks to provide a solution to the above mentioned problems by providing a system and method of allowing audio content of a piece of audio-visual content to be pre-downloaded to a user's mobile device and then played (preferably through headphones) in synchronisation with the visual content which is playing on a separate visual display system.

The present disclosure also allows the synchronization of the playback of slave audio content on one or more mobile devices to a master audio content and/or a master visual content on a separate visual display system. In other words, in some embodiments, the present disclosure allows the synchronisation of a slave audio content on one or more mobile devices to a master audio content on a separate visual display system. In other embodiments, the present disclosure allows the synchronisation of a slave audio content on one or more mobile devices to a master visual content on a separate visual display system. In other embodiments, the present disclosure allows the synchronisation of a slave audio content on one or more mobile devices to a master visual content and a master audio content on a separate visual display system.

FIG. 1 illustrates a system 60 for synchronizing a slave audio content on one or more mobile devices 50, 51, 52 to a master audio content or a master visual content on a separate visual display system 10. The separate visual display system 10 is located at a location remote from the one or more mobile devices 50, 51, 52 in accordance with some embodiments. In the system, 60, each user of the mobile device accesses an audio synchronization application on the mobile device. The mobile device can be any type of fixed device, or portable device including mobile handsets, units, devices, multimedia tablets, phablets, communicators, desktop computers, laptop computers, personal digital assistants, or any combination thereof, that is specifically configured to perform the functions of the mobile device with speakers, headphones, or ear buds that are wired or wirelessly connected to the mobile device. The mobile device 50, 51, 52 may communicate with a processing server 30, a data storage server 40, and a time server 20 via a communication network (not shown). The audio synchronization application may be downloaded from the data storage server 40 by the user at a predetermined time or when desired.

The visual display system 10 may communicate with a processing server 30, a data storage server 40, and a time server 20 via a communication network (not shown). In some embodiments, a visual player display application may be downloaded and installed on the visual display system for providing an interface for controlling and playing the visual content. A visual output device 11 may be connected via wired or wireless connection with the visual display system. According to various embodiments, the visual output device may be a visual display output, for example, a television, a projector, or monitor configured for viewing by an audience in a public setting. When the visual display system is initiated by an operator to play the master visual content, the master visual content is displayed on the visual output device. The master visual content may include but is not limited to: film, TV, digital visual content or the like. In some embodiments, the present disclosure allows the synchronisation of a slave audio content on one or more mobile devices to a master visual content on a separate visual display system. For example, in the context of a show or a movie screening that is shown on a visual output device at an event, the slave audio content played on an audience member's mobile device at the event can be synchronised with the master visual content that is playing on the visual display system. The master visual content may be downloaded or played from the data storage server or stored on the memory of the visual display system.

The time server 20 is a server that reads the actual time from a reference clock and distributes this information using a communication network. The time server may be a server which utilises a Network Time Protocol (NTP) for distributing and synchronizing time over the communication network.

The processing server 30 may be a single server or a server group. The server group may be centralized, or distributed (e.g., processing server 30 may be a distributed system). In some embodiments, the processing server 30 may be local or remote. For example, the processing server 30 may access information and/or data stored in the visual display system or the mobile device via the communication network. As another example, the processing server 30 may be directly connected to the visual display system to access stored information and/or data. In some embodiments, the processing server 30 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

The data storage server 40, which may be in network communication with the visual display system 10 and the mobile devices 50, 51, 52, may include separated slave audio content and master visual content or master audio content. The master visual content can be downloaded via the communication network to the visual display system and stored within the memory of the visual display system. The visual display system also contains a processor (not shown) that operates to execute or run code or programming to perform a number of functions; particularly, a video player application (not shown). In some embodiments, the master visual content may not have to be downloaded from the data storage server 40. In some embodiments, it may be uploaded onto the visual display system via a direct connection to a hard-drive. In some embodiments, the slave audio content can be downloaded from the data storage server by the mobile device via the communication network to the mobile device and stored in the memory of said mobile device.

In some embodiments, the present disclosure allows the synchronisation of a slave audio content on one or more mobile devices to a master audio content on a separate visual display system. For example, in the context of a live visual display performance at a first location, the slave audio content played on an audience member's mobile device at a second location can be synchronised with the master audio content that is playing on the visual display system. In some embodiments, the visual display system may be in wired or wireless communication with a control system 12. The control system 12 is a system of devices or set of devices that commands or regulates the behavior of other devices or systems to achieve desired results. In some embodiments, the control system 12 includes input devices such as buttons, keys or switches to trigger portions of a live visual display performance. The master audio content, that is configured to play on the visual display system, may include one or more audio cue tracks that can be embedded, mixed or combined into one or more audio soundtracks to form the master audio content, so that the audio cue track can be an accurate depiction of time relative to the audio soundtracks. The slave audio content that is configured to play on the mobile devices may include one or more slave audio cue tracks that can be embedded, mixed or combined into one or more audio soundtracks to form the slave audio content such that all slave audio content is of the same predetermined duration as the master audio content. The audio cue tracks are configured to control or activate portions of a live visual display performance. The audio cue tracks may include sound cues or audio timecode such as a SMPTE timecode, an FSK timecode or a LTC (Linear Time Code), each of which is a standard protocol for timecodes. The audio cue tracks can include cues which can be in the form of fireworks, timing, lighting or sound cues that control or direct portions of the live visual display performance. For example, in a fireworks display, the audio cue track may include fireworks cues, each of which activate a different set of fireworks at different times. On the other hand, the master audio content may include audio soundtracks which may be music content or sound recordings, that may be input to a separate audio output device (not shown). In some embodiments, the audio cue tracks are fed into the control system from the visual display system. In some embodiments, the audio cue tracks are fed into one or more control systems by one or more external devices (not shown) which may be slave mobile devices playing the audio cue track in synchronisation with the visual display system. In other embodiments, the control system includes control signals that correspond to audio timecodes for activating cues of the live visual display performance. On the other hand, the slave audio content may include audio soundtracks which may be music content or sound recordings, that may be played by audience member's slave mobile devices.

The master audio content is an audio soundtrack of a predetermined duration. As mentioned previously, the slave audio content may include slave audio cue tracks which can include audio timecodes, lighting cues, sound cues or firework cues on its own or a combination thereof. Each of the one or more slave audio cue tracks are of the same predetermined duration as the master audio content. The slave audio cue tracks can be played on one or more slave external devices via an audio synchronisation application. In this way, by allowing slave external devices, such as a mobile device, to play slave audio cue tracks which are played in synchronisation with the master audio content playing on the visual display system, an operator of the slave mobile device can control or direct portions of the live visual display performance. For example, in one embodiment, the slave mobile device can be in wired or wireless communication with a second control system that is different from the control system in wired or wireless communication with the visual display system. The second control system can in turn be configured to trigger a lighting cue or fireworks cue upon receiving control signals that correspond to the slave audio cue track playing on the slave mobile device. In another embodiment, the slave mobile device may not be in communication with the second control system. The operator of the mobile device will listen to the slave audio cue track playing on the mobile device and will trigger the lighting cue or fireworks cue on the second control system when the operator receives the cue to do so.

By way of an example, a visual display system may play a master audio content comprising an audio cue track which includes audio timecode such as SMPTE, FSK or LTC. The audio cue track is fed into a first control system which has one or more fireworks cues associated with various timecode positions. In some embodiments, a second or third control system in separate locations remote from the visual display system and the first control system, may be fed, via a mobile device, a slave audio cue track, including audio timecode configured for controlling visual or sound effects. A lighting display operator with a mobile device may listen to an audio cue track, which includes verbal cues, in order to trigger the intended lighting cues at intended positions of the live visual display performance. The mobile device of the lighting display operator is playing the slave audio cue track in synchronisation with the master audio cue track playing on the visual display system. In some embodiments, audience members may listen to the audio soundtrack, which might include a music soundtrack, on a slave mobile device played in synchronization to the visual display system. This allows various audio visual components of a fireworks event to operate in synchronisation with each other.

By connecting the mobile devices 50, 51, 52 and the visual display system 10 to the processing server 30, data storage server 40 and the time server 20 via the communication network, this allows the slave audio content configured for playing on the mobile device to be synchronised with the master audio content and/or the master visual content played on a separate visual display system 10, thereby allowing audience members who are watching a visual output device 11 that displays the master visual content to have a better audio and visual experience of the event.

As used herein, the mobile devices 50, 51, 52, the visual display system 10, visual output device 11, and control system 12, may exchange data via any communication network, such as a Local Area Network (LAN), a Metropolitan Area Network (MAN), a Wide Area Network (WAN), a proprietary network, and/or Internet Protocol (IP) network such as the Internet, an Intranet or an extranet. Each device, module or component within the system may be connected over a network or may be directly connected. A person skilled in the art will recognize that the terms 'network', 'computer network' and 'online' may be used interchangeably and do not imply a particular network embodiment. In general, any type of network may be used to implement the online or computer networked embodiment of the present disclosure. The network may be maintained by a server or a combination of servers or the network may be serverless. Additionally, any type of protocol (for example, HTTP, FTP, ICMP, UDP, WAP, SIP, H.323, NDMP, TCP/IP) may be used to communicate across the network. The devices and systems as described herein may communicate via one or more such communication networks.

Figure 2:
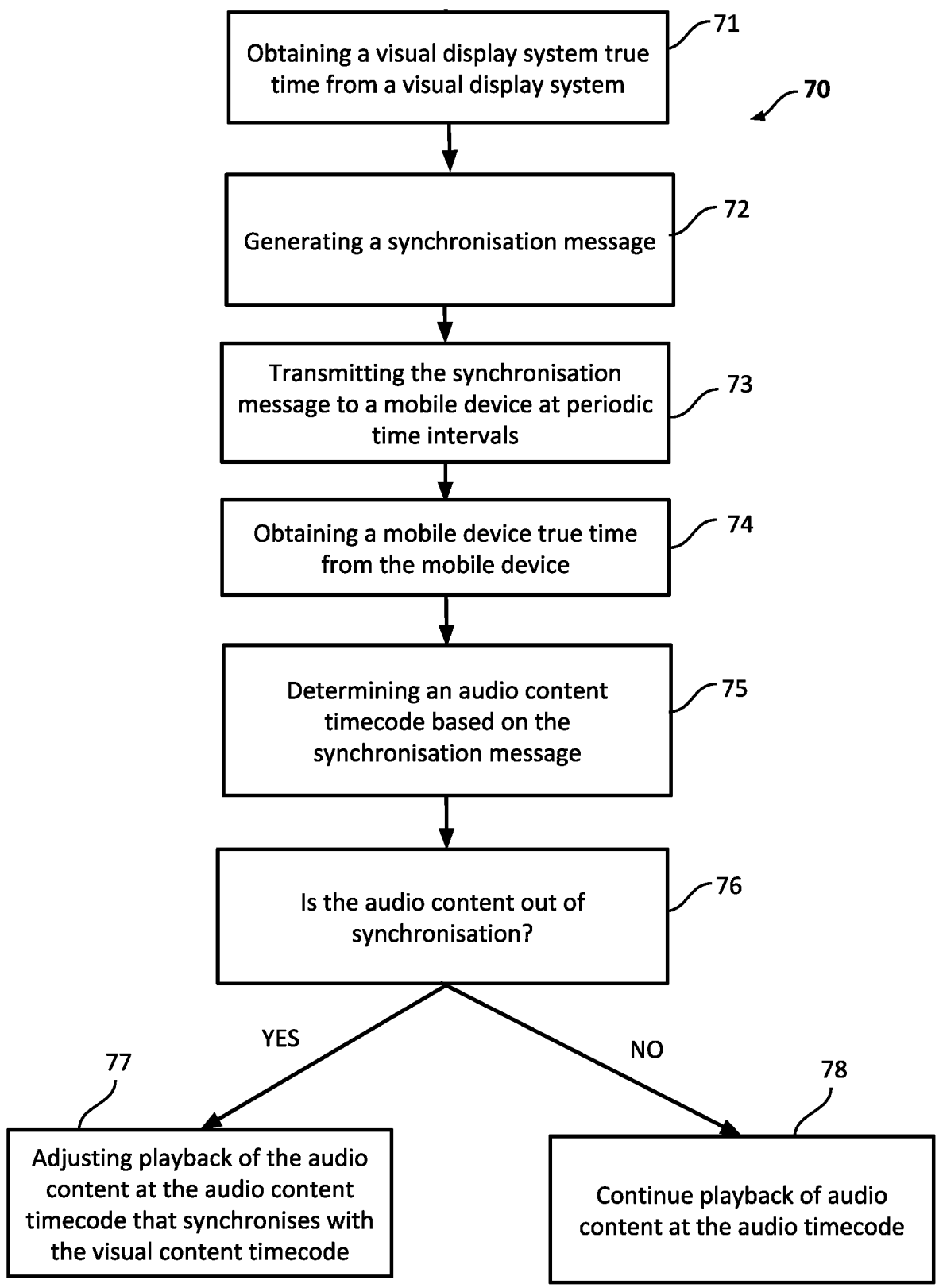
FIG. 2 is a flow chart illustrating an exemplary method for synchronizing a slave audio content on one or more computing devices to a master audio content or a master visual content configured for playing on a separate visual display system in accordance with various embodiments.

FIG. 2 is a flow chart illustrating an exemplary method for synchronizing a slave audio content on one or more computing devices to a master audio content or a master visual content configured for playing on a separate visual display system in accordance with various embodiments. When an audience member arrives at a location where the master visual content of a predetermined duration can be viewed on the visual output device, for example, at a date and time of the show that was previously communicated to the audience member, or at a live visual display performance where only the master audio content of a predetermined duration is played on the visual display system, the audience member can initiate a download of an audio synchronisation application. The audio synchronisation application allows the audience member to download the slave audio content of the show, which has the same predetermined duration as the master visual content or the master audio content, from a data storage server that the audience member is interested to view. In some embodiments, the download of the slave audio content from the data storage server can be done elsewhere prior to arriving at the predetermined location and time. In some embodiments, the audience member is provided a selection of one or more shows for purchase, whether at the predetermined location, or elsewhere, and the user is prompted to pay for the show using, but not limited to, a payment gateway or an electronic wallet, credits or subscription fees. On successful payment of the selected show, the audience member can download the slave audio content of the selected show into the memory of the mobile device.

At the predetermined location and time, the operator will initiate broadcast of the master visual content or master audio content on the visual display system. In some embodiments, the operator will initiate broadcast of the master visual content or master audio content on a visual display player application which provides an interface for the operator to control and to play the master visual content or master audio content. The master visual content is output to a visual output device, for example, a screen, projector, TV or the like. In step 71, when the master visual content or master audio content is triggered to play by the operator, the visual display system obtains the visual display system true time. The visual display system true time is determined based on the visual display system local time and the visual display system time deviation and is based on the following formula:

VISUAL DISPLAY SYSTEM TRUE TIME=visual display system local time+visual display system time deviation The visual display system time deviation is the time difference between the visual system local time and a time server time obtained from a time server in communication with the visual display system.

At step 72, the visual display system proceeds to generate a synchronisation message comprising the following information:

1. Visual display system true time;
2. Master visual content timecode or master audio content timecode; and
3. Master visual content state or master audio content state.

The master visual content timecode corresponds to the current time position of the master visual content that is playing on the visual display system. The master visual content state or the master audio content state is associated with the operation mode or status of the master visual content or master audio content state respectively. The operation mode or status can be 'playing' or 'stopped', which indicates if the master visual content or the master audio content is continuing to play or if the content has stopped play. Once the synchronisation message is generated, it is transmitted to the processing server.

At step 73, the synchronisation message is transmitted at periodic time intervals to the mobile device by the processing server when the mobile device is triggered to play the slave audio content by the audience member. The transmission of the synchronisation message at periodic time intervals to the mobile device is enabled by a WebSocket communication protocol. This allows the mobile device to be listening or constantly communicating with the processing server in order for the synchronization messages to be sent at periodic time intervals. For example, this can be transmitted once every second. The WebSocket communication protocol also allows the mobile device to receive synchronisation messages whenever the visual display system has been adjusted forward or backward in timecode or changes its state from "playing" to "stopped" or vice versa. In other words, whenever there is a manual adjustment by the operator to the master audio content timecode or master visual content timecode or change in state of the master audio content state or master visual content state respectively, one or more synchronisation messages will be transmitted to the mobile device accordingly.

At step 74, the mobile device will determine the mobile device true time. The mobile device true time is determined based on the mobile device local time and the mobile device time deviation and is based on the following formula:

MOBILE DEVICE TRUE TIME=mobile device local time+mobile device time deviation

The mobile device time deviation is the time difference between the mobile device local time and a time server time obtained from a time server in communication with the mobile device.

At step 75, the mobile device will determine a slave audio content timecode that is based on the master visual content timecode or the master audio content timecode, the mobile device true time and the visual display system true time. The slave audio content timecode is determined based on the following formula:

LATENCY=MOBILE DEVICE TRUE TIME−VISUAL DISPLAY SYSTEM TRUE TIME

SLAVE AUDIO CONTENT TIMECODE=master visual content timecode or master audio content timecode+LATENCY The slave audio content timecode is determined based on aggregating the master visual content timecode or the master audio content timecode and the latency, which is determined by the time difference between the mobile device true time and the visual display system true time. The slave audio content timecode corresponds with the current position of the master visual content timecode or the master audio content timecode playing on the visual display system.

At step 76, when the master visual content or the master audio content is detected to be in a playing mode, the audio synchronisation application will determine if the slave audio content timecode is out of synchronisation with the master visual content timecode or the master audio content timecode. Since the mobile device is in constant connection with the processing server via the WebSocket communication protocol, the mobile device receives synchronisation messages at periodic time intervals. This allows the audio synchronisation application to check if the audio content timecode is out of synchronisation with the master visual content timecode or the master audio content timecode within a predetermined time interval. The formula for determining if the slave audio content timecode is out of synchronisation with the master visual content timecode or the master audio content timecode is the following:

DIFFERENCE=SLAVE AUDIO CONTENT TIME-
CODE−current slave audio content timecode

At step 77, if the slave audio content timecode is out of synchronisation with the master visual content timecode or the master audio content timecode beyond ±200 ms (ie. DIFFERENCE is beyond ±200 ms in either direction), for example, the mobile device will adjust playback of the slave audio content timecode that is synchronised with the master audio content timecode or master visual content timecode associated with the current position of the content on the visual display system. In some embodiments, the predetermined interval can be approximately +200 ms or approximately −200 ms to be considered out of synchronisation with the master visual content timecode or the master audio content timecode. At step 78, if the difference is less than ±200 ms, the mobile device will continue playing the slave audio content timecode in synchronisation with the master visual content timecode or the master audio content timecode.

Embodiment 1

Figure 3:
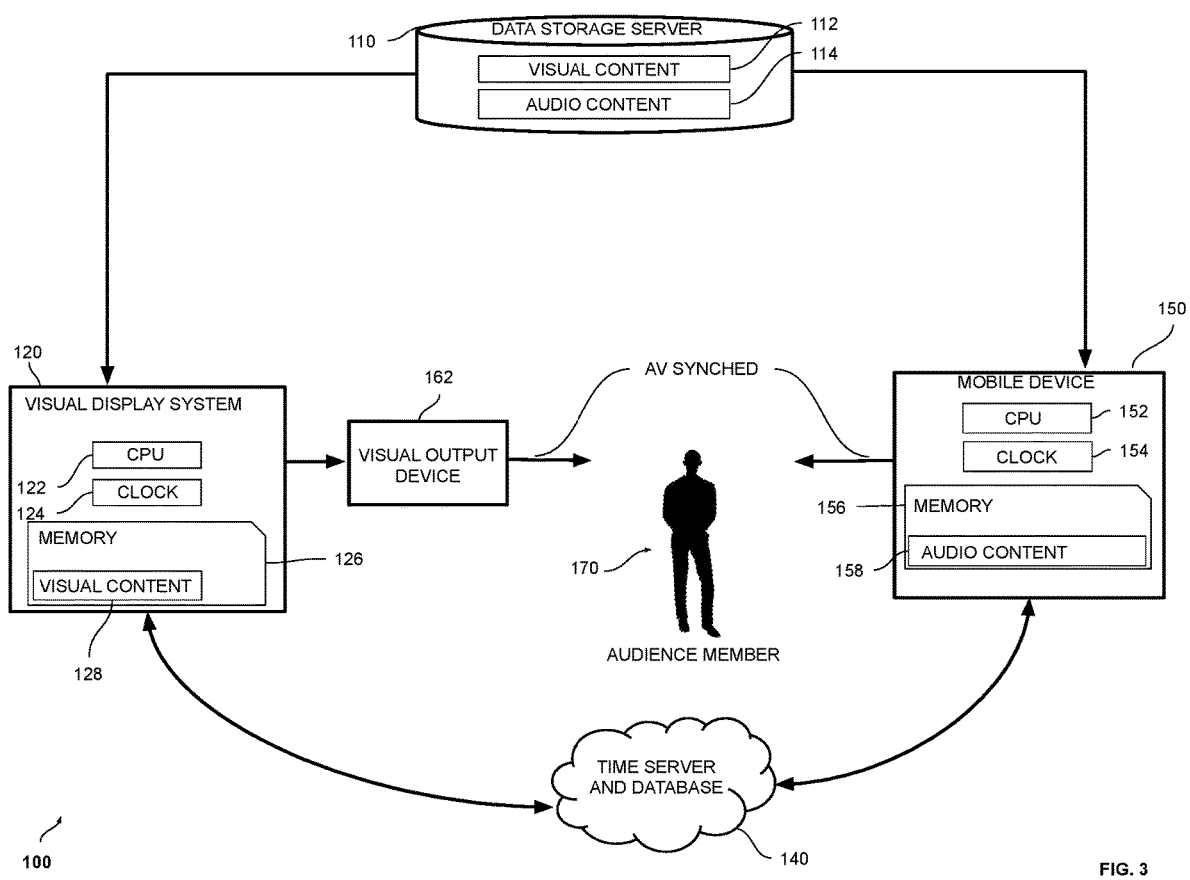
FIG. 3 illustrates a high-level system overview for synchronizing audio content on a mobile device to a visual content on a separate visual display system.

FIG. 3 illustrates an overview of the components of the system 100 that will allow separated visual content 112 and audio content 114 of an audio-visual content file to be played back on a visual display system and on one or more mobile devices respectively, in synchronisation with each other. When triggered to play, the visual display system notifies a time server of the visual content timecode associated with the current position of the visual content playing on the visual display system and a visual content state ("playing" or "stopped") of the visual content that is playing on the visual display system. The time server records the visual content timecode with the current time (timestamp) and visual content state. A user's mobile device will play the audio content of the audio-visual content by fetching the most current time, visual content state, visual content timecode and timestamp from the time server and then adjusting the playback of the audio content to synchronise with the visual content that is playing on the visual display system. In some embodiments, the audio-visual content file may include a show, but is not limited to: film, TV, video content, fireworks, lighting, water, laser shows or the like.

A timecode is a sequence of numeric codes generated at regular intervals by a timing synchronization system. Timecode is used in video production, show control and other applications which require temporal coordination or logging of recording or actions. In the context of this disclosure, "timecode" refers to any symbolic naming of consistent, timed intervals throughout the entirety of an audio or visual media which can be used to reference the position of the "playing" or "stopped" audio or visual content file. In order to synchronise separated audio and visual content, when they are played back, their timecodes should match precisely.

To account for network delays, both the visual display system and the mobile device will check the time server relay time when connecting with the time server. These relay times are used in the adjustment of the audio content playback on the mobile device.

A data storage server 110 has, in storage, separated visual content 112 and audio content 114 of a specific audio-visual content file. The visual content 112 of the audio-visual content file is downloaded via the internet (not shown), or other similar communication network, to a visual display system 120 and stored within the memory 126. The visual display system 120 also contains a processor 122 that operates to execute or run code or programming to perform a number of functions. For example, the processor may execute or run a visual display application. In some embodiments, the visual content may not have to be downloaded from the data storage server 110 but may be loaded onto the visual display system 120 via a direct connection from an external storage source, for example, a hard-drive.

The audio content 114 of the specific audio-visual content file is downloaded via the internet (not shown), or a communication network, to a mobile device 150 and stored in the memory 156 of said device. In some embodiments, the audio content may not have to be downloaded from the server 110, but may be loaded into the memory of the mobile device from an external device or storage source. In some embodiments, the audio content may be obtained wirelessly or via a wired connection from the external device or storage source. In some embodiments, the external device or storage source may be a hard-drive.

A time server 140 is a server device that reads the actual time from a reference clock and distributes this information using a communication network. This time server 140 also has a database for the recording of information.

When the visual display system 120 is set to start playing the visual content 128 (triggered using controls that may include but is not limited to: a keyboard, mouse, voice controls, time or the like) there will be a visual display output via a connection to visual output device 162, for example, a projector, television, or monitor. Simultaneously, the visual display system 120, using the processor 122 and visual display system clock 124, will check via the internet (not shown), or similar communication network, a visual display system time server relay time using pings or similar method. The visual display system time server relay time is the time taken for a ping to be transmitted from the visual display system to the time server and back. Subsequently, it will send the visual content timecode, the visual display system time server relay time and the visual content state ("playing" or "stopped") to the time server 140. The time server immediately records the time at which it receives the visual content timecode herein referred to as timestamp. The time server 140 records the timestamp, visual content timecode, visual display system server relay time and current state ("playing" or "stopped") into its database.

The mobile device 150 can be any type of fixed or portable computing device: including mobile handsets, units, devices, multimedia tablets, phablets, communicators, desktop computers, laptop computers, personal digital assistants, or any combination thereof, that is specifically configured to perform the functions of a mobile device with speakers, headphones, earbuds that are wired or wirelessly connected to the mobile device 150. In this discussion the term "mobile device" and "computing device" may be used interchangeably.

The mobile device 150 may access a communication network and communicate with other computers and systems, for example, a processing server, a database, and/or a time server, a visual display system and a display device operatively connected to the visual display system, all of which are interconnected via the communication network.

The mobile device 150 also contains a processor 152 for the execution or running of code or programming applications. In some embodiments, the processor performs the execution or running of an audio synchronisation application. The audio synchronization application may be downloaded by the user or pre-installed on the mobile device. On playing the audio content 158 on the mobile device 150 the device will first check a mobile device time server relay time using pings or similar method, via the internet (not shown), or similar communication network, using the processor 152 and mobile device clock 154. The mobile device time server relay time is the time taken for a ping to be transmitted from the mobile device to the time server and back. Subsequently, the mobile device 150 will fetch from the time server 140 the timestamp, visual content timecode, visual display time server relay time and visual content state ("playing" or "stopped") of the visual display system 120. Using the timestamp, visual content timecode, visual content state and time server relay times (of both the visual display system and the mobile device) the mobile device 150 will adjust the audio content 158 to play back in sync with the visual content on the visual display system. In order to adjust the audio content to playback in synchronisation with the visual content on the visual display system, the mobile device determines a mobile device true time using NTP protocol, i.e., the mobile device checks the time server for the current time of the time server and determines the mobile device true time based on the current server time and the mobile device time server relay time. The audio synchronisation application subsequently determines an audio timecode configured to play the audio content at a position that is synchronised with the current position of the visual content timecode playing on the visual display system. The audio content timecode is determined by the following formula:

AUDIO CONTENT TIMECODE=(mobile device true time−(timestamp−visual display system time server relay time/2))+visual content timecode The audience member(s) 170 will experience the visual content 128 from the visual output device 162 and audio content 158 via the mobile device 150 seamlessly and with audio-visual sync.

As used herein, a mobile device 150 may exchange information via any communication network, such as a Local Area Network (LAN), a Metropolitan Area Network (MAN), a Wide Area Network (WAN), a proprietary network, and/or Internet Protocol (IP) network such as the Internet, an Intranet or an extranet. Each device, module or component within the system may be connected over a network or may be directly connected. A person skilled in the art will recognize that the terms 'network', 'computer network' and 'online' may be used interchangeably and do not imply a particular network embodiment. In general, any type of network may be used to implement the online or computer networked embodiment of the present disclosure. The network may be maintained by a server or a combination of servers or the network may be serverless. Additionally, any type of protocol (for example, HTTP, FTP, ICMP, UDP, WAP, SIP, H.323, NDMP, TCP/IP) may be used to communicate across the network. The devices and systems as described herein may communicate via one or more such communication networks.

Figure 4:
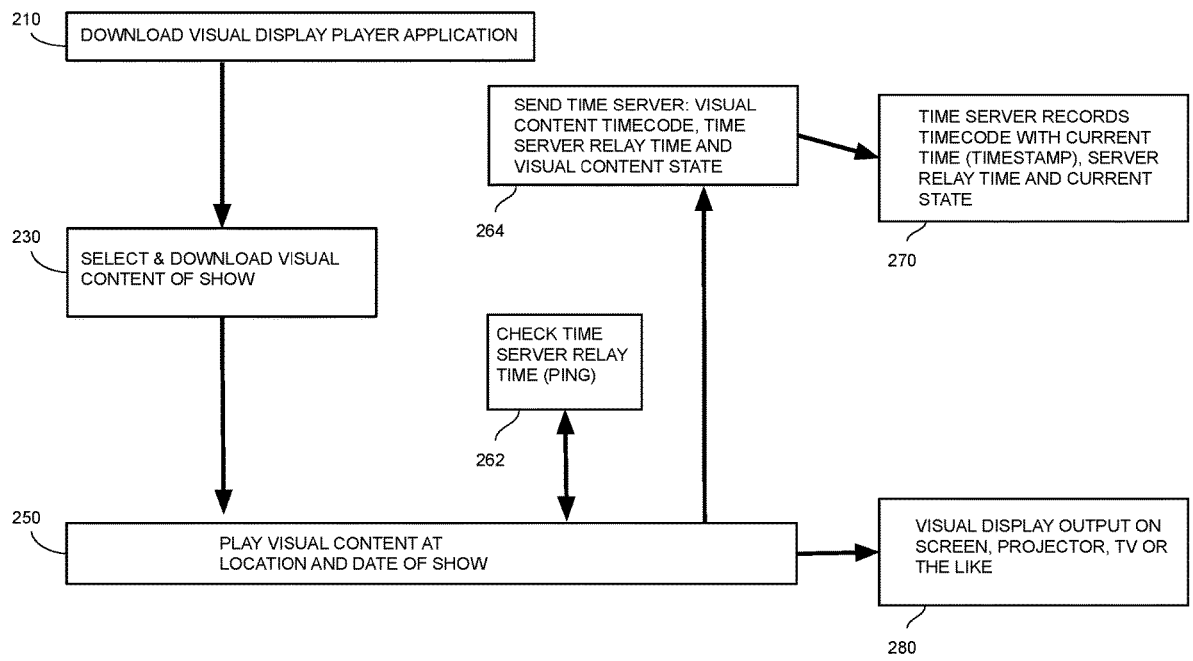
FIG. 4 is a flow chart illustrating an exemplary method on a visual display system for enabling synchronisation of separate audio content to a visual content on a separate visual display system.

FIG. 4 is a flow chart illustrating an exemplary method for enabling the synchronisation of separate audio content to a visual content on a visual display system. The visual display system is connected to the internet (or similar communication network). At step 210, an operator downloads and installs a visual display player application into the operating system of the visual display system. At step 230, the operator selects the audio-visual content file that will be scheduled to be played at a predetermined date and time and the visual content of the audio-visual content file is downloaded, stored in memory or opened and loaded from local memory of the visual display system.

In some embodiments, and at step 250, the operator plays the visual content on the visual display player application on the visual display system at the location, date and time of the show. At step 280, the visual content is output to a visual output device, for example, a screen, projector, TV or the like. Simultaneously, at step 262, the visual display player application will check time server relay time using pings or similar method, and at step 264, send the time server the visual content timecode, time server relay time and visual content state ("playing" or "stopped"). The time server immediately records the time at which it receives the visual content timecode herein referred to as timestamp. At step 270, the time server records this timestamp, visual content timecode, server relay time and current state ("playing" or "stopped") into its database.

According to various embodiments, a time server is a server that reads the actual time from a reference clock and distributes this information using a communication network. The time server, in this instance, also has a database for recording information. The time server may be a local network time server or an internet server. In some embodiments, a Network Time Protocol (NTP) is used for distributing and synchronizing time over the communication network.

Figure 5:
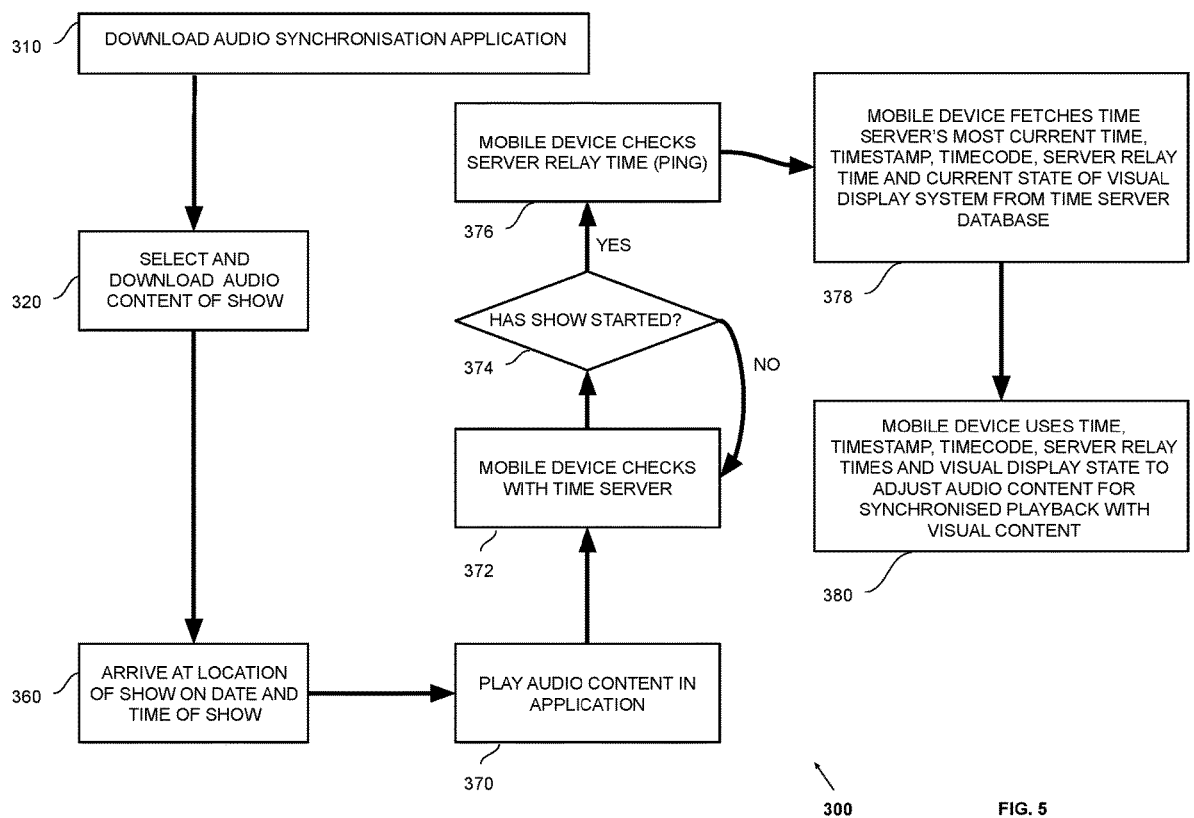
FIG. 5 is a flow chart illustrating an exemplary method for synchronising audio content on one or more mobile devices to a visual content on a separate visual display system.

FIG. 5 is a flow chart illustrating an exemplary method for synchronising audio content on a mobile device to a visual content on a separate visual display system. The mobile device is connected to the internet (or similar communication network). At step 310, an audience member downloads and installs into the operating system of the mobile device an audio synchronisation application. At step 320, the audience member selects a show for purchase and, as an optional step, the audience member is then prompted to pay for the show using but not limited to a payment gateway, internal wallet, subscription fees, credits or the like. Alternatively, if the show does not require any payment, the audience member would not be required to make payment. On successful payment or if no payment is required the audio content of the show is downloaded and stored in the memory of the mobile device.

At step 360, the audience member arrives at the location on the specified date and time of the show and at step 370, the audience member triggers the application to play the audio content. At step 372, the mobile device will check the time server using the internet (or similar communication network) to confirm if the show has started. At step 374, if the show has started, the mobile device confirms the presence of a record: of a timestamp, timecode and a visual content state in a 'playing' status, from the visual display system. If the mobile device does not detect a record or if it detects the visual content state in a "stopped" status on the time server database, then the audio content will not play. At step 376, if the mobile device detects there is a timestamp, timecode and the visual content state in a "playing" status, the mobile device will then check the server relay time using pings or similar method. At step 378, the mobile device will fetch the time server's current time, timestamp, timecode, server relay time and visual content state ("playing" or "stopped" status) of the visual display system from the time server database and use these along with the server relay time of the mobile device to calculate adjustments for the audio content to be played back in sync 380 with the visual content. In order to adjust the audio content to playback in synchronisation with the visual content on the visual display system, the mobile device uses the timestamp, visual content timecode, visual content state and time server relay times (of both the visual display system and the mobile device). The mobile device determines a mobile device true time using NTP protocol, i.e., the mobile device checks the time server for the current time of the time server and determines the mobile device true time based on the current server time and the mobile device time server relay time. The audio synchronisation application subsequently determines an audio timecode configured to play the audio content at a position that is synchronised with the current position of the visual content timecode playing on the visual display system. The audio content timecode is determined by the following formula:

> AUDIO CONTENT TIMECODE=(mobile device true time−(timestamp−visual display system time server relay time/2))+visual content timecode In some embodiments, the time server and database 140 may be a single server or a server group. The server group may be centralized, or distributed (e.g., may be a distributed system). In some embodiments, the time server and database 140 may be local or remote. In some embodiments, the time server and database may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

Embodiment 2

Figure 6:
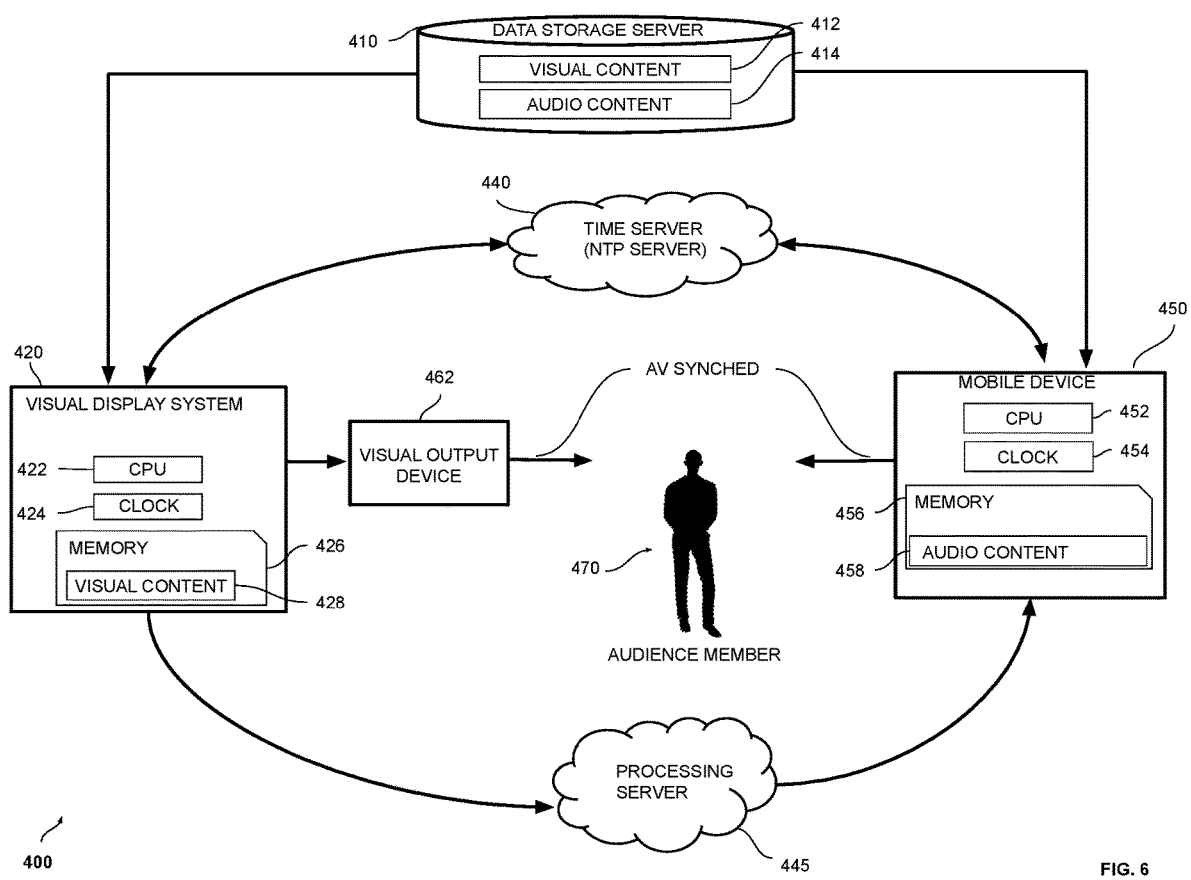
FIG. 6 illustrates an alternative high-level system overview of synchronizing audio content on a mobile device to a visual content on a separate visual display system.

FIG. 6 illustrates an overview of the components of the system 400 that will allow separated visual content 412 and audio content 414 of an audio-visual content to be played back on separate devices in synchronisation with each other. In some embodiments, the audio-visual content is a show but is not limited to: film, TV, video content, fireworks, lighting, water, laser shows or the like.

FIG. 6 illustrates an alternative embodiment, where the time server is a separate entity, i.e., different from the time server as disclosed in Embodiment 1 above, and the communication between the mobile device and the visual display system occurs through a processing server 445. The time server as disclosed in this embodiment refers to a time server device that is publicly available on the internet, for example, the Google Public NTP time server, that reads the actual time from a reference clock and distributes this information using NTP protocol.

A data storage server 410 has, in storage, separated visual content 412 and audio content 414 of a specific show. The visual content 412 of a show is downloaded via the internet (not shown), or other similar communication network, to a visual display system 420 and stored within the memory 426 of the visual display system. In some embodiments, the visual content and the audio content are both downloaded via the communication network to the visual display system. The visual display system 420 also contains a processor 422 that operates to execute or run code or programming to perform a number of functions. For example, the processor may be programmed to run a visual display application. In some embodiments, the visual content may not be downloaded from the data storage server 410 but may be loaded onto the visual display system 420 via a wireless or wired connection from an external data source. For example, the external data source may be a hard-drive.

The audio content 414 of the specific show is downloaded via the internet (not shown), or similar communication network, to a mobile device 450 and stored in the memory 456 of said device. The audio content may not have to be downloaded from the data storage server 410. In some embodiments, the audio content may be loaded into the memory of the mobile device via a wireless or wired connection from an external data source. For example, the external data source may be a hard-drive.

A time server 440 is a server device that reads the actual time from a reference clock, for example, a time server that is publicly available on the internet, and distributes this information using NTP protocol. NTP protocol involves synchronizing a client to a network server using several packet exchanges where each exchange is a pair of request and reply. When sending out a request, the client stores its own time (originate timestamp) into the packet being sent. When a server receives such a packet, it will in turn store its own time (receive timestamp) into the packet, and the packet will be returned after putting a transmit timestamp into the packet. When receiving the reply, the receiver will once more log its own receipt time to estimate the travelling time of the packet. The travelling time (delay) is estimated to be half of "the total delay minus remote processing time", assuming symmetrical delays.

There is also a processing server 445 for the transmission of a synchronisation message from the visual display system 420 to all the mobile devices 450. The protocol for the transmission of synchronisation messages from the processing server to the mobile devices can be established through a lightweight and fast connection using Websockets or similar protocol via the processing server 445. This constant connection between the processing server and mobile devices will allow frequent and regular synchronisation messages to be sent to the mobile devices from the visual display system. Both the mobile device and visual display system also regularly check the mobile device time deviation and the visual display system time deviation respectively from the time server 440.

When the visual display system 420 is set to start playing the visual content 428 (triggered using controls that may include but is not limited to: a keyboard, mouse, voice controls, time or the like) there will be a visual display output via a connection to visual output device 462. In some embodiments, the visual output device is a projector, television, monitor. Simultaneously, the visual display system 420, using the processor 422 and clock 424, will check via the internet (not shown), or similar communication network, the current time from the time server 440 and calculate its visual display system time deviation. Using its local time and time deviation from time server time it can derive the visual display system true time. Subsequently, it will send via the internet (not shown), or similar communication network, the visual content timecode, visual display system true time and the visual content state to the processing server 445. The visual content state may include a "playing" or a "stopped" status. This process will happen periodically throughout an audio-visual show.

The mobile device 450 also contains a processor 452 for the execution or running of code or programming. In some embodiments, the processor is programmed to run an audio synchronisation application. On playing the audio content 458 on the mobile device 450, the device will check, via the internet (not shown), or similar communication network, the time from the time server 440 and calculate its own time deviation using the processor 452 and a mobile device clock 454. When the mobile device is triggered to play an audio content, the mobile device will connect with the processing server, to receive synchronisation messages from the visual display system. The mobile device 450 will receive via the internet (not shown), or similar communication network, from the processing server 445 the synchronisation messages.

Each synchronisation message includes:
 a visual content state ("playing" or "stopped");
 a visual content timecode;
 a visual display system true time;

On receipt of a synchronisation message the mobile device will do one of two things. A visual content state of 'playing' indicates that the visual content is playing on the visual display output device or the visual display system. If the mobile device receives a synchronisation message with a visual content state that has a status of 'stopped', the audio content will not play.

The mobile device will check its mobile device time deviation from the time server 440. The mobile device then uses the mobile device time deviation along with the data from the synchronisation messages to calculate the current visual content timecode or the current position of the visual content playing on the visual display system 420 and adjust the playback of the audio content on the mobile device to synchronise with the visual content displayed on the visual output device. The mobile device time deviation is the delta or time difference between the mobile device local time and the current time obtained from the time server. Correspondingly, the visual display system time deviation is the delta or the time difference between the visual display system local time and the current time obtained from the time server.

The audience member(s) 470 will experience the visual content 428 from the visual output device 462 and audio content 458 via the mobile device 450 seamlessly and with audio-visual sync.

The calculation is done according to the following formulas for each sync message. Here is an example of the synchronisation message:
 SYNCHRONISATION MESSAGE=
 visual display system true time;
 visual content timecode (current position);
 visual content state ("playing" or "stopped")

MOBILE DEVICE TRUE TIME=mobile device
 local time+mobile device time deviation

VISUAL DISPLAY SYSTEM TRUE TIME=visual
 display system local time+visual display system
 time deviation

LATENCY=MOBILE DEVICE TRUE TIME−VISUAL DISPLAY SYSTEM TRUE TIME

LATENCY accounts for the relay time for the "sync message" between the visual display system and the mobile device.

AUDIO CONTENT TIMECODE=visual content
 timecode+LATENCY

DIFFERENCE=AUDIO CONTENT TIMECODE−
 current audio content timecode

The audio application on the mobile device checks if the player is at the AUDIO CONTENT TIMECODE. If there is a DIFFERENCE of more than 200 ms between the AUDIO CONTENT TIMECODE and the current audio content timecode, the player will adjust to the AUDIO CONTENT TIMECODE.

Since there is a constant risk of desynchronisation due to variable network conditions and performance degradation of the mobile device 450 and visual display system 420, the mobile device and visual display system establish a light-weight and fast connection using Websockets or similar protocol via the processing server 445. This constant connection will allow frequent and regular "sync messages" to be sent to the mobile device from the visual display system. Both the mobile device and visual display system also regularly check the mobile device time deviation and the visual display system time deviation respectively. This constant and frequent process of checking the mobile device true time and the visual display system true time along with the sending of "sync messages" ensures synchronisation of the visual content with the audio content with less than 200 ms of deviation.

The WebSocket communication protocol defines a mechanism for fast, secure, near real-time, two-way communication between a client (i.e. the mobile device and the visual display system) and a processing server over the communication network. Data is transferred over a full-duplex single socket connection, allowing data packets to be sent and received from both endpoints in real-time. To establish a WebSocket connection, a specific, HTTP-based handshake is exchanged between the client and the server. If successful, the application-layer protocol is "upgraded" from HTTP to WebSocket, using the previously established TCP transport layer connection. After the handshake, HTTP is no longer used and data can be sent or received using the WebSocket protocol by both endpoints until the WebSocket connection is closed. Data is therefore transferred between the audio synchronization application (on the mobile device) and the visual display application (on the visual display system), and vice versa, through the WebSocket communication protocol on the server.

Figure 7:
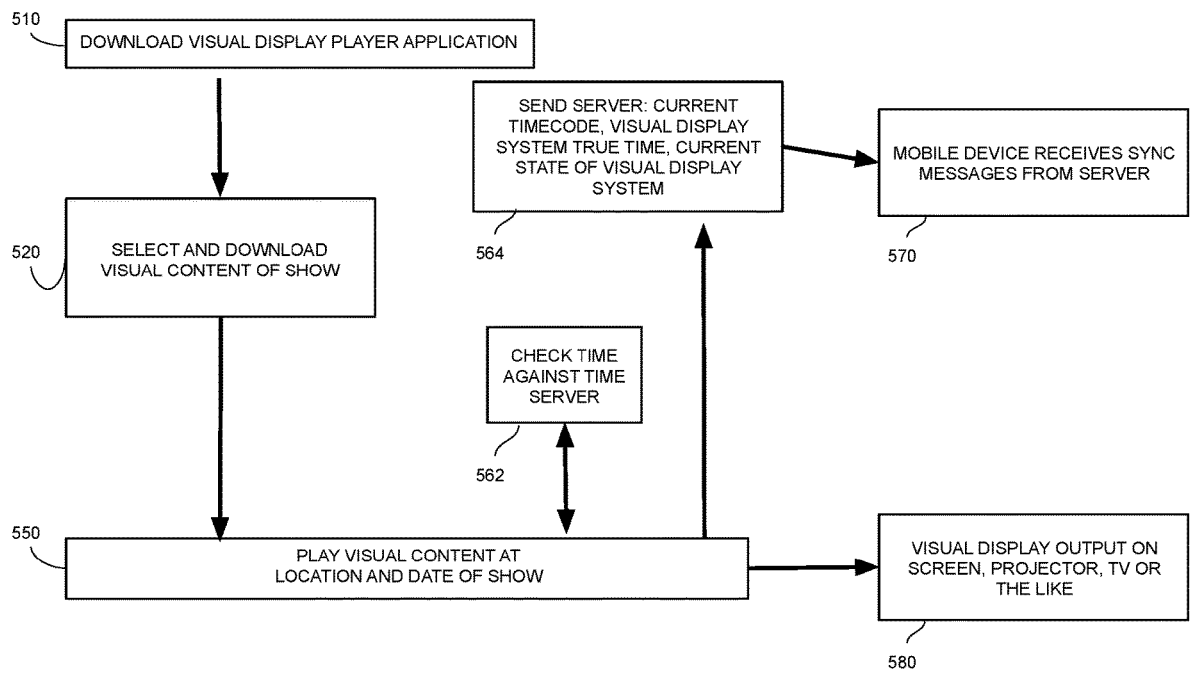
FIG. 7 is a flow chart illustrating an exemplary method on a visual display system for enabling synchronisation of separate audio content on mobile devices to a visual content on a separate visual display system.

FIG. 7 is a flow chart illustrating an exemplary method for enabling the synchronisation of audio content on separate mobile devices to a visual content on a visual display system 500. At a predetermined location and time, the operator will initiate broadcast of a visual content on the visual display system that is in wired or wireless communication with a network. The master visual content is output to a visual output device, for example, a screen, projector, TV or the like. At step 510, a visual display player application is downloaded, installed or written into the operating system of the visual display system. At step 520, an operator will select a show on the visual display player application. Once selected, the visual content of the show is downloaded and stored in memory of the visual display system. In some embodiments, the visual content of the show is already preloaded on the memory of the visual display system. In some embodiments, the visual content of the show may be downloaded from an external storage device.

At step 550, at the predetermined location, date and time of the show, the operator can trigger the visual display system to play the visual content in the application. At step 580, the visual content is displayed on a visual output device. In some embodiments, the visual output device is a screen, projector, TV or the like. Simultaneously, at step 562, when the visual content is triggered to play by the operator, the visual display system or the visual display application obtains the visual display system true time. The visual display system true time is determined based on the visual display system local time and the visual display system time deviation and is based on the following formula:

VISUAL DISPLAY SYSTEM TRUE TIME=visual display system local time+visual display system time deviation The visual display system time deviation is the time difference between the visual display system local time and a time server time obtained from a time server in communication with the visual display system.

At step 564, the visual display system proceeds to generate a synchronisation message comprising the following information:
1. Visual display system true time;
2. Visual content timecode; and
3. Visual content state.

The visual content timecode corresponds to the current time position of the visual content that is playing on the visual display system. The visual content state is associated with the operation mode or status of the visual content. The operation mode or status can be 'playing' or 'stopped', which indicates if the visual content is continuing to play or if the visual content has stopped play. Once the synchronisation message is generated, it is transmitted to the processing server.

At step 570, the synchronisation message is transmitted at periodic time intervals to the mobile device by the processing server when the mobile device is triggered to play the audio content by the audience member. The transmission of the synchronisation message at periodic time intervals to the mobile device is enabled by a WebSocket communication protocol. This allows the mobile device to be listening or to be in constant communication with the processing server in order for the synchronization messages to be sent at periodic time intervals. For example, this can be transmitted once every second. The WebSocket communication protocol also allows the mobile device to receive synchronisation messages whenever the visual display system has been adjusted forward or backward in timecode or changes its state from "playing" to "stopped" or vice versa. In other words, whenever there is a manual adjustment by the operator to the master audio content timecode or master visual content timecode or change in state of the master audio content state or master visual content state respectively, one or more synchronisation messages will be transmitted to the mobile device accordingly.

Figure 8:
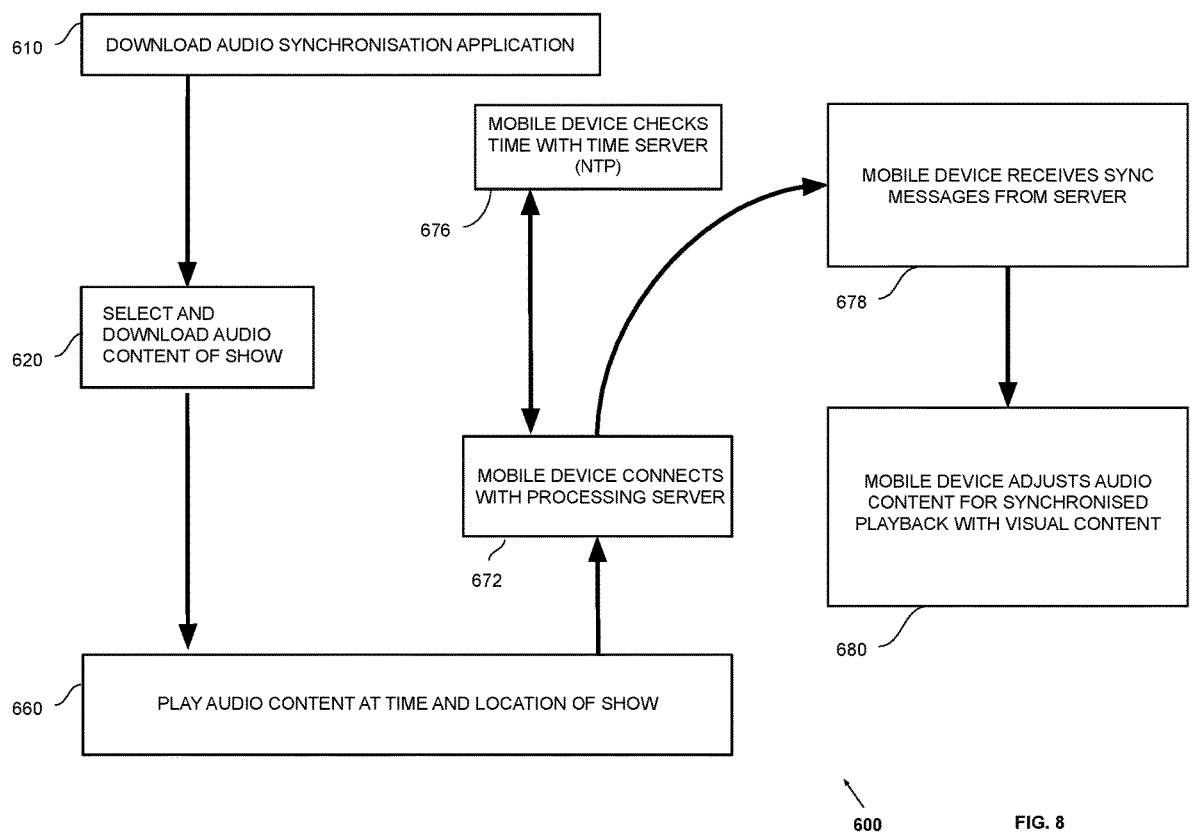
FIG. 8 is a flow chart illustrating an exemplary method for synchronising audio content on one or more mobile devices to a visual content on a separate visual display system.

FIG. 8 is a flow chart illustrating an exemplary method for synchronising audio content on a mobile device to a visual content on a separate visual display system. The mobile device is connected to the internet (not shown), or similar communication network. At step 610, an audio synchronisation application is downloaded, installed or written into the operating system of the mobile device. At step 620, the audience member will select a show for purchase. In some embodiments, the audience member is prompted to pay for the show using but not limited to a payment gateway, internal wallet, subscription fees, credits or the like. In some embodiments, the show may not require payment and is complimentary for audience members. On successful payment or where payment is not required as the show is complimentary, the audio content of the show is downloaded and stored in the memory of the mobile device.

At step 660, on arrival at the predetermined location, date and time of the show, the audience member triggers the audio synchronisation application to play the audio content on the audio synchronisation application. At step 672, the mobile device will connect with the processing server using the internet (not shown), or similar communication network, to listen to synchronisation messages from the visual display system. On receipt of a synchronisation message, 678, the mobile device will do one of two things. A visual content state of 'playing' indicates that the visual content is playing on the visual output device or the visual display system. If the mobile device receives a synchronisation message with a visual content state that has a status of 'stopped', the audio content will not play.

At step 676, the mobile device will determine a mobile device true time. The mobile device true time is determined based on the mobile device local time and the mobile device time deviation and is based on the following formula:

MOBILE DEVICE TRUE TIME=mobile device local time+mobile device time deviation

The mobile device time deviation is the time difference between the mobile device local time and a time server time obtained from a time server in communication with the mobile device.

At step 680, the mobile device will determine an audio content timecode that is based on the visual content timecode, the mobile device true time and the visual display system true time. The audio content timecode allows the audio synchronisation application to adjust the audio content to be played at the audio content timecode in synchronisation with the visual content playing on the visual display system. The audio content timecode is determined based on the following formula:

LATENCY=MOBILE DEVICE TRUE TIME−VISUAL DISPLAY SYSTEM TRUE TIME

AUDIO CONTENT TIMECODE=visual content timecode+LATENCY

The audio content timecode is determined based on aggregating the visual content timecode and the latency, which is determined by the time difference between the mobile device true time and the visual display system true time. The audio content timecode corresponds with the current position of the visual content timecode playing on the visual display system.

When the visual content is detected to be in a playing mode, the audio synchronisation application will determine if the audio content timecode is out of synchronisation with the visual content timecode. Since the mobile device is in constant connection with the processing server via the WebSocket communication protocol, the mobile device receives synchronisation messages at periodic time intervals. The synchronisation messages are also transmitted by the processing server whenever there is an adjustment to the visual content timecode or change in state of the visual content state. This allows the audio synchronisation application to check if the audio content timecode is out of synchronisation with the visual content timecode within a predetermined time interval. The formula for determining if the audio content timecode is out of synchronisation with the visual content timecode is the following:

DIFFERENCE=AUDIO CONTENT TIMECODE-
current audio content timecode

If the audio content timecode is out of synchronisation with the visual content timecode beyond ±200 ms, for example, the mobile device will adjust playback of the audio content timecode that is synchronised with the visual content timecode associated with the current position of the content on the visual display system. In some embodiments, the predetermined interval can be approximately +200 ms or approximately −200 ms to be considered out of synchronisation with the visual content timecode. If the difference is less than ±200 ms the mobile device will continue playing the audio content timecode in synchronisation with the visual content timecode.

In use, the process of synchronising audio content on an audience member's mobile device to a visual content that is displayed on a separate visual output device may be used in the setting of an outdoor public cinema. The cinema operator, for example, would use a visual display system and/or visual display application to download the visual part (or visual content) of a movie to the memory of the system. The audience members would download the audio content of the movie through an audio synchronisation application on their mobile devices. When the visual display system starts playing, the audience members may trigger their mobile devices to play the audio content. This process of synchronisation uses clocks, a time server (NTP), timecode, synchronisation messages sent via a server and calculations to adjust the audio content to play in sync with the visual content such that the audience member may watch the film with audio-visual sync as if the audio and visual components of the movie were never separated. The audio content may be either the original audio from the film or alternate audio such as a director's commentary or different audio language tracks of the film.

An alternate use case may be the synchronisation of audio content on an audience member's mobile device to a live visual display, for example, fireworks, lighting, water, laser shows or the like. The operator, for example, would use a visual display system 420 and an application to download a master audio content to the memory 426 of the system. The master audio content may comprise an audio cue track which may include audio timecode such as SMPTE, FSK or Linear Time Code. The audio timecode track may be fed into a digital control system, which can read audio timecode, and has been preconfigured to initiate fireworks cues at certain positions of the timecode track. An audio cue track may also include pre-recorded verbal cues for a manual operator to trigger a series of fireworks. The audio cue track may cue the control signals of any component of a live visual display, for example a lighting control desk, fireworks control module, digital firing systems or the like. A manual fireworks operator may listen to the audio cue track via a slave mobile device playing the audio cue track in synchronisation with the visual display system master audio content. Audience members may download a slave audio content of the live show through an application on their mobile devices 450. This slave audio content may include an audio soundtrack that corresponds to or synchronizes with the master audio content playing on the visual display system to provide an immersive audio experience to the audience member. In some embodiments, the audio soundtrack may include voice commentary, singing performances and/or music soundtracks. Since the digital control system is synchronized via audio timecode to the visual display system and any slave audio devices playing audio cue tracks are also synchronised with the visual display system; the slave audio content on the audience member's mobile devices 450 will be in synchronisation with the live visual display of fireworks, lasers, lights, or water display etc.

Yet another use case may involve various different slave audio tracks synchronized with the master audio track such that various crew members on a live show may be able to listen to their individual cue track in synchronisation with the master audio track.

For example, in a live theatrical performance the lighting, sound, pyrotechnics personnel and stage hands etc may all be listening to their specific cue tracks on their individual mobile devices 450 that are in sync with a master audio track on a visual display system 420 controlled by the stage manager.

In yet another example, in a fireworks show, multiple manual pinboard operators may listen on their individual mobile devices 450 to the same slave audio cue track to trigger fireworks and pyrotechnics in synchronization to a master audio track played on a visual display system 420. Meanwhile the audience members may watch the fireworks show whilst listening on their individual mobile devices 450 to the audio soundtrack (eg narration/music soundtrack) of the fireworks show without the pyrotechnics trigger cues.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method of synchronizing an audio content configured for playback on a mobile device to a visual content of an audio-visual display configured for playing on a separate visual display system, comprising the steps of:
   presenting the visual content on a visual output device controlled by the visual display system at a first location and time;
   obtaining, from the visual display system, a visual display system true time based on a visual display system local time and a visual display system time deviation,
   generating, by the visual display system, a synchronisation message configured for transmission to a processing server, wherein the synchronisation message includes the visual display system true time, a visual content state and a visual content timecode;
   transmitting, by the processing server, the synchronisation message at a periodic time interval to the mobile device,
   determining an audio content timecode that is based on the visual content timecode, a mobile device true time and the visual display system true time; wherein when triggered to play the audio content on the mobile device at a second location and time when the visual content state is in a playing mode, the audio content is played at the audio content timecode that is synchronised with the visual content timecode associated with the current position of the visual content on the visual display system.

2. The method according to claim 1, comprising the step of:
determining if the audio content timecode is out of synchronisation beyond a predetermined time interval with the visual content timecode on the visual display system, and;
adjusting playback of the audio content on the mobile device to the audio content timecode that is synchronised with the visual content timecode associated with the current position of the visual content on the visual display system, in response to when the audio content timecode is out of synchronisation beyond the predetermined time interval.

3. The method according to claim 1, wherein the audio content timecode is determined based on aggregating the visual content timecode and the time difference between the mobile device true time and the visual display system true time.

4. The method according to claim 1, wherein the synchronisation message is transmitted when there is an adjustment made to the visual content timecode.

5. The method according to claim 1, wherein the synchronisation message is transmitted when there is a change in state to the visual content state.

6. The method according to claim 3, wherein the mobile device true time is determined based on a mobile device local time and a mobile device time deviation, wherein the mobile device time deviation is the time difference between the mobile device local time and a time server current time derived from a time server in communication with the mobile device.

7. The method according to claim 1, wherein the visual display system time deviation is the time difference between the visual display system local time and a time server current time derived from a time server in communication with the visual display system.

8. The method according to claim 2, wherein the predetermined time interval is approximately 200 ms.

9. A method of synchronizing a slave audio content configured for playback on a mobile device to a master audio content synchronised with a live visual display, wherein the master audio content is configured for playing on a separate visual display system, comprising the steps of:
playing the master audio content on the visual display system at a first location and time;
obtaining, from the visual display system, a visual display system true time based on a visual display system local time and a visual display system time deviation;
generating, by the visual display system, a synchronisation message configured for transmission to a processing server, wherein the synchronisation message includes the visual display system true time, a master audio content state and a master audio content timecode;
transmitting, by the processing server, the synchronisation message at a periodic time interval to the mobile device;
determining a slave audio content timecode that is based on the master audio content timecode, a mobile device true time and the visual display system true time, wherein when triggered to play the slave audio content on the mobile device at a second location and time when the master audio content state is in a playing mode, the slave audio content is played at the slave audio content timecode that is synchronised with the master audio content timecode associated with the current position of the master audio content on the visual display system.

10. The method according to claim 9, comprising the step of:
determining if the slave audio content timecode is out of synchronisation beyond a predetermined time interval with the master audio content timecode on the visual display system, and;
adjusting playback of the slave audio content on the mobile device to the audio content timecode that is synchronised with the master audio content timecode associated with the current position of the master audio content on the visual display system, in response to when the slave audio content timecode is out of synchronisation beyond the predetermined time interval.

11. The method according to claim 9, wherein the slave audio content comprises slave audio cue tracks for initiating a portion of the live visual display, whereby the slave audio cue tracks are transmitted to one or more control systems by one or more computing devices, such that the audio cue tracks are configured for synchronisation with the master audio content.

12. The method according to claim 9, wherein the slave audio content comprises an audio sound track associated with a voice recording that is configured for synchronisation with the master audio content.

13. The method according to claim 9, wherein the slave audio content comprises an audio sound track associated with a music accompaniment that is configured for synchronisation with the master audio content.

14. The method according to claim 9, wherein the master audio content includes an audio cue track, configured for triggering a portion of a live visual display by a controller or manual operator.

15. The method according to claim 9, wherein the slave audio content comprises a slave audio cue track configured for triggering a portion of a live visual display, by a manual operator, that is configured for synchronisation with the master audio content.

16. The method according to claim 9, wherein the synchronisation message is transmitted when there is an adjustment made to the visual content timecode.

17. The method according to claim 9, wherein the synchronisation message is transmitted when there is a change in state to the visual content state.

18. The method according to claim 9, wherein the slave audio content timecode is determined based on aggregating the master audio content timecode and the time difference between the mobile device true time and the visual display system true time, and wherein the mobile device true time is determined based on a mobile device local time and a mobile device time deviation, wherein the mobile device time deviation is the time difference between the mobile device local time and a time server current time derived from a time server in communication with the mobile device.

19. The method according to claim 9, wherein the visual display system true time is determined based on a visual display system local time and a visual display system time deviation, wherein the visual display system time deviation is the time difference between the visual display system local time and a time server current time derived from a time server in communication with the visual display system.

20. The method according to claim 9, wherein the predetermined time interval is approximately 200 ms.

21. A method configured for implementing on a mobile device having at least one processor, at least one computer-readable storage medium, and a synchronisation application connected to a network, comprising:
- transmitting an audio content configured for storing on the mobile device;
- obtaining a mobile device true time based on a mobile device local time and a mobile device time deviation, wherein the mobile device time deviation is the time difference between the mobile device local time and a time server current time derived from a time server in communication with the mobile device;
- receiving a synchronisation message at a periodic time interval from a processing server in wireless communication with a visual display system, wherein the synchronisation message includes a visual display system true time, a visual content state, and a visual content timecode;
- determining an audio content timecode that is based on the visual content timecode, the mobile device true time and the visual display system true time; wherein the visual display system true time is determined based on a visual display system local time and a visual display system time deviation, wherein the visual display system time deviation is the time difference between the visual display system local time and a time server current time derived from a time server in communication with the visual display system;
- wherein when triggered to play the audio content on the mobile device when the visual content state is in a playing mode, the audio content is played at the audio content timecode that is synchronised with the visual content timecode associated with the current position of the visual content on the visual display system.

22. A method of synchronizing a slave audio content configured for playback on a mobile device to a master audio content configured for playing on a separate visual display system, comprising the steps of:
- obtaining, from the visual display system, a visual display system true time based on a visual display system local time and a visual display system time deviation wherein the visual display system time deviation is the time difference between the visual display system local time and a time server current time derived from a time server in communication with the visual display system;
- generating, by the visual display system, a synchronisation message configured for transmission to a processing server, wherein the synchronisation message includes the visual display system true time, a master audio content state associated with the operation mode, and a master audio content timecode associated with the current position of the visual display system;
- transmitting, by the processing server, the synchronisation message at a periodic time interval to the mobile device,
- determining a slave audio content timecode that is based on the master audio content timecode, a mobile device true time and the visual display system true time; wherein the mobile device true time is based on the mobile device local time and a mobile device time deviation wherein the mobile device time deviation is the time difference between the mobile device local time and a time server current time derived from the time server in communication with the mobile device;
- wherein when triggered to play the slave audio content on the mobile device when the master audio content state is in a playing mode, the slave audio content is played at the slave audio content timecode that is synchronised with the master audio content timecode associated with the current position of the master audio content on the visual display system.

23. A system for synchronizing a slave audio content configured for playback on a mobile device to a master audio content configured for playing on a separate visual display system, comprising:
- a memory;
- one or more processors coupled with the memory, wherein the memory includes processor executable code that, when executed by the processor, causes the processor to perform operations including:
- obtaining, from the visual display system, a visual display system true time; wherein the visual display system true time is determined based on a visual display system local time and a visual display system time deviation, wherein the visual display system time deviation is the time difference between the visual display system local time and a time server current time derived from a time server in communication with the visual display system;
- generating, by the visual display system, a synchronisation message configured for transmission to a processing server, wherein the synchronisation message includes the visual display system true time, a master audio content state associated with the operation mode, and a master audio content timecode associated with the current position of the visual display system;
- transmitting, by the processing server, the synchronisation message at a periodic time interval to the mobile device,
- determining a slave audio content timecode that is based on the master audio content timecode, a mobile device true time and the visual display system true time wherein the mobile device true time is based on the mobile device local time and a mobile device time deviation wherein the mobile device time deviation is the time difference between the mobile device local time and a time server current time derived from the time server in communication with the mobile device;
- wherein when triggered to play the slave audio content on the mobile device when the master audio content state is in a playing mode, the slave audio content is played at the slave audio content timecode that is synchronised with the master audio content timecode associated with the current position of the master audio content on the visual display system.

* * * * *